United States Patent [19]

Searls

[11] 3,713,613
[45] Jan. 30, 1973

[54] METHOD AND APPARATUS FOR RUNNING TELEPHONE CABLE

[75] Inventor: Charles E. Searls, Cypress, Calif.

[73] Assignee: General Telephone Company of California

[22] Filed: Nov. 1, 1971

[21] Appl. No.: 194,620

[52] U.S. Cl. .................248/49, 248/68 R, 248/228, 52/665
[51] Int. Cl. ................................................F16l 3/00
[58] Field of Search ..248/68 R, 68 CB, 49, 229, 228, 248/72; 211/126; 317/99, 101 CE; 52/220

[56] References Cited

UNITED STATES PATENTS

| 3,563,882 | 2/1971 | Kimura et al. | 248/49 |
| 3,363,048 | 1/1968 | Vaughn | 248/68 R |
| 2,770,336 | 11/1956 | Vevirit et al. | 52/665 |

FOREIGN PATENTS OR APPLICATIONS

| 68,254 | 8/1969 | Germany | 248/49 |

Primary Examiner—Roy D. Frazier
Assistant Examiner—Rodney H. Bonck
Attorney—Pastoriza & Kelly

[57] ABSTRACT

A grid structure is substituted for the conventional overhead cable racks for running cable between switch panels mounted on vertical bays in a central telephone office. The grid structure permits selected switch panels to be connected together by running a cable directly upwardly from a first switch panel, through a first opening in the grid structure, thence horizontally along the top of the grid structure in a straight line direction to a second opening in the grid structure directly above a second switch panel, and directly down through the second opening to the second switch panel. By this arrangement, point to point overhead straight line connections can be made rather than having to run the cable along the assigned paths as was the case with the old type cable racks all to the end that substantial savings in man hours and cable costs result.

2 Claims, 6 Drawing Figures

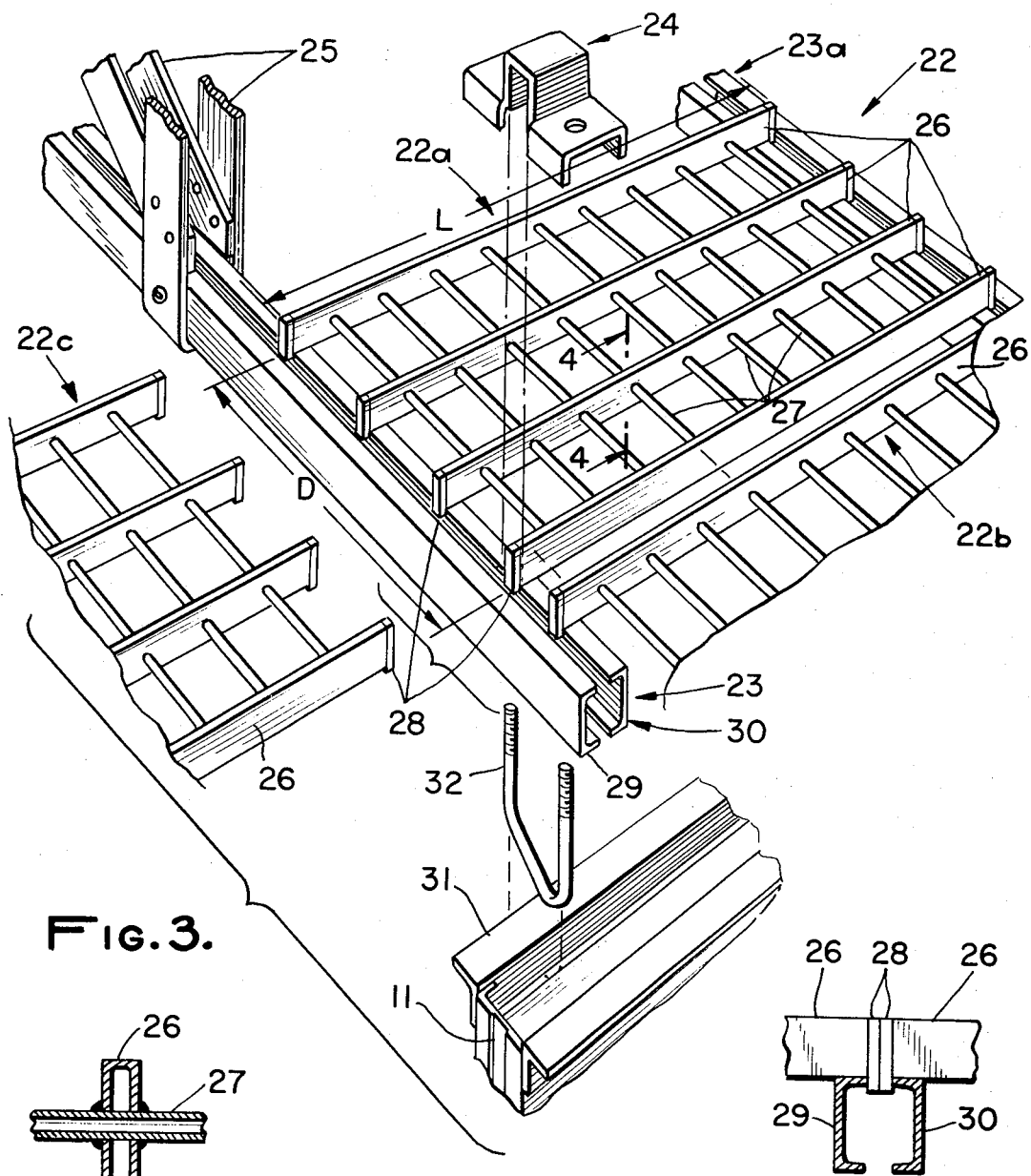
FIG. 3.
FIG. 4.
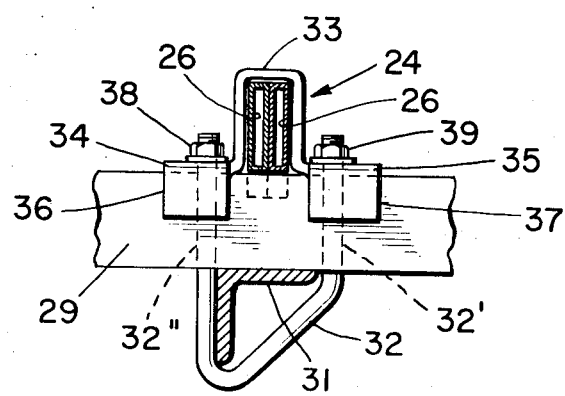
FIG. 5.
FIG. 6.

3,713,613

METHOD AND APPARATUS FOR RUNNING TELEPHONE CABLE

This invention relates generally to telephone operations and more particularly to a novel method and apparatus for running telephone cable in central switching offices.

BACKGROUND OF THE INVENTION

Over the years in substantially all central telephone switching offices and similar facilities wherein banks of switch panels are supported in vertical bays, it has been traditional and conventional practice to utilize cable runways in the form of metal-like trough structures for holding cable utilized in effecting inter-connections between the various panels. These cable racks or runways follow predetermined routes and are mounted above the upper ends of the bays at right angles across the room or building housing the bays. As a consequence of this construction connecting certain panels which may be housed in widely separated bays has necessitated running cable from one of the panels up to the overhead cable rack and thence in a direction generally parallel to the panel to an aisle wherein a main cable rack then serves to support the cable. The cable extends down the main cable rack passing perhaps several bays until it reaches the particular bay housing the remote panel to which a connection is to be made. The cable then runs along a branch cable rack at right angles to the main cable rack to a position over the particular panel to which the connection is to be made and thence downwardly to the panel in question. The cable must thus follow a pre-assigned path and many man hours are required in running cable to effect desired connections. Moreover, the cable involved which will house many individual conductors is expensive and because of the necessity of following pre-assigned routes, a considerable amount of cable is required.

BRIEF DESCRIPTION OF THE PRESENT INVENTION

With the foregoing in mind, the present invention contemplates a novel method and apparatus for running cable between switch panels mounted on vertical bays in a central telephone office wherein problems encountered heretofore with conventional type cable racks and the running of cable therealong are avoided.

More particularly, the invention contemplates substitution of a grid structure for the conventional cable racks in a position lying in a horizontal plane adjacent to the upper ends of the bays. Cable can then be run by passing one end from a switch panel directly upwardly through an opening in the grid structure and thence horizontally along the top of the grid structure in a straight line direction to a second opening in the grid structure directly above another switch panel to which a connection is to be made. The cable is passed down through this second opening to the switch panel in question. As a result of this overhead point to point running of the cable, a substantial savings in cable material and man hours is realized.

The preferred grid structure, in accord with the invention, is made up of modular grid units. A unique compound supporting and clamping means secures the modular grid units in side by side and end to end relationship to the upper ends of the bays. There is further provided ceiling support means to stabilize the resulting grid structure with respect to the building housing the bays.

BRIEF DESCRIPTION OF THE DRAWINGS

A better understanding of the invention will be had by referring to the accompanying drawings in which:

FIG. 3 is still another perspective view showing modular grid units making up the grid structure of FIG. 2 in exploded relationship;

FIG. 4 is a fragmentary cross-section taken in the direction of the arrows 4—4 of FIG. 3;

FIG. 5 is a cross-section of part of the support means for the grid structure of FIG. 3 when in assembled relationship; and, FIG. 6 is another cross-section of a support and clamping means utilized in the assembly of the modular grid units shown in FIG. 3.

DETAILED DESCRIPTION OF THE PREFERRED EMBODIMENT

Figure 1:
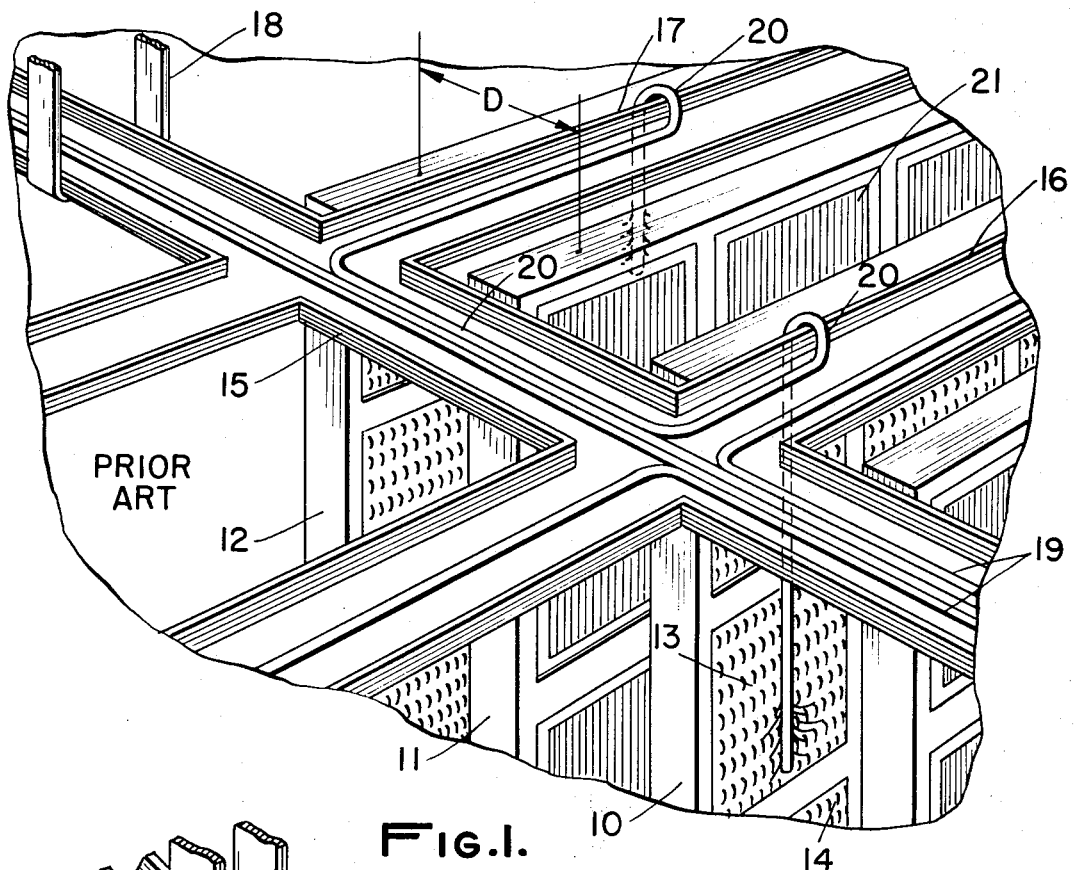
FIG. 1 is a fragmentary perspective view looking downwardly from a ceiling position at a plurality of vertical bays together with conventional type cable racks for running cable between panels in the bays.

Referring first to FIG. 1 there is shown a plurality of vertical bays 10, 11, and 12 for mounting switch panels such as indicated, by way of example, at 13 and 14 for the bay 10. Adjacent to the upper ends of the bays is a main cable rack 15 which, as shown, is conventionally in the form of a trough-like structure. Branch cable racks such as indicated at 16 and 17 extend at right angles from the main rack 15 to pass above alleys defined between adjacent bays. The various panels in the respective bays have front and rear surfaces, the rear surfaces being utilized for connections. The arrangement of the panels is such that the rear surfaces face each other for two adjacent bays such as bays 11 and 12 so that the branch cable rack 17 passing down the alley between these bays can support cable which may readily be connected to the rear portions of the switch panels in either of the bays 11 and 12. Since no connections are made to the front of the switch panels, there is no necessity for a branch cable rack passing between the bays 10 and 11, for example. The cable racks are supported from the ceiling at periodic intervals, one such support structure being indicated at 18. Several cables such as 19 are shown in the main rack 15, some of these cables passing along the branch cable racks 16 and 17.

The foregoing construction is entirely conventional and has been used in most telephone switch offices for many years. To effect a connection between certain switch panels, the cable is run up from a particular switch panel on to the closest overhead cable rack and thence along the various racks until it is positioned adjacent to the switch panel to which it is to be connected. For example, there is illustrated a cable 20 passing from the switch panel 13 on the bay 10 directly upwardly to the cable rack 16. Assuming it is desired to connect this cable to another switch panel such as switch panel 21 in the bay 12, the cable 20 is passed along the cable rack 16 to the main cable rack 15, down this rack until it reaches the bay 12 and thence along the branch cable rack 17. It is then passed over the rack downwardly to the panel 21.

Since the cable must follow pre-assigned paths defined by the cable racks, it is evident that substantial lengths of cable are often necessary to interconnect panels in different bays.

Referring now to FIG. 2 there are shown again the bays 10, 11 and 12 but as a substitute for the conventional cable racks described in FIG. 1, there is provided the novel grid structure designated generally by the arrow 22. This grid structure is mounted in a horizontal plane adjacent to the upper ends of the bays and defines openings of sufficient size that cable may be easily manually passed therethrough and yet supported thereby when running horizontally along the top without appreciable sagging at those cable portions passing over the openings defined by the grid. Compound support and clamping means indicated at 23 and 24 are provided for supporting the grid structure directly to the top ends of the bays. In addition, securing means such as 25 may be provided to anchor the grid structure to the ceiling of the building housing the bays.

With the foregoing arrangement, and assuming that it is desired to connect the switch panels 13 and 21 as described in FIG. 1, it is now only necessary to pass a cable such as 20' directly upwardly through an opening in the grid structure above the panel and thence horizontally along the top of the grid structure as indicated at 20'' in a direction towards another opening directly above the switch panel 21. The cable may then be passed downwardly as indicated by the portion 20''' to effect a direct connection to the switch panel.

It will be immediately evident that substantially less cable is required to effect the connections than was the case with conventional cable racks as described in FIG. 1. Further, the time required for installation is substantially reduced.

Referring now to FIG. 3, further details of the grid structure will be described. As shown, the grid structure 22 is made up of a plurality of modular grid units shown exploded away from each other at 22a, 22b and 22c. These grids are arranged to be assembled in side by side and end to end relationship to provide the overall grid structure shown in FIG. 2.

Figure 2:
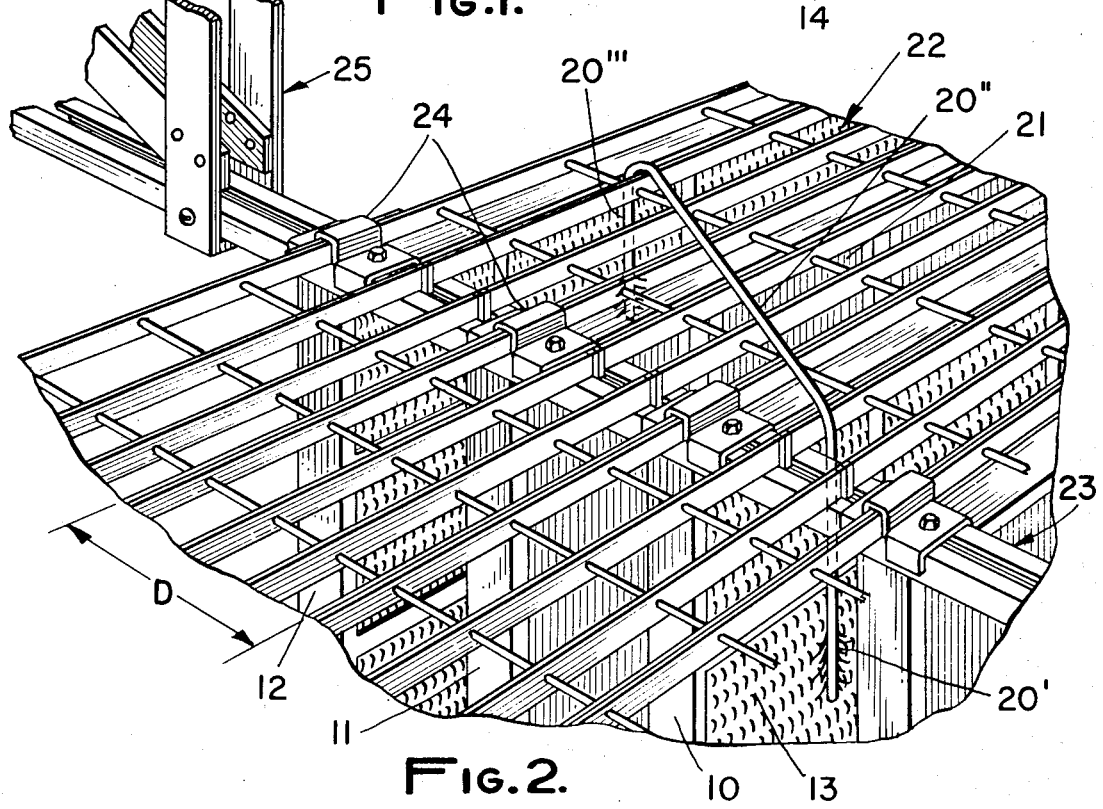
FIG. 2 is a fragmentary perspective view showing the bays of FIG. 1 but utilizing a grid structure in accord with the present invention in place of the conventional cable racks.

Still referring to FIG. 3, each grid unit has a width D corresponding to the distance between adjacent bays (also indicated by D in FIG. 2). The length L of the unit in the particular embodiment shown is about one and one-half times the width. The unit itself comprises a plurality of hollow bars 26 running in a longitudinal direction in transversely spaced parallel relationship and a plurality of tubular members 27 running transversely between the longitudinal bars to define therewith rectangular shaped openings. Each end of the hollow bars includes a flange portion 28 extending downwardly beyond the bottom surface of the bar to define a toe. The modular grid units 22b and 22c only fragmentary views of which are shown in FIG. 3 are identical in construction.

The flange portions 28 defining the toes cooperate with the compound supporting and clamping means 23 and 24, the clamp means 24 being shown exploded above the grid units. This compound supporting and clamping means includes channel members 29 and 30 in opposing relationship to define a two-bar support means running in a transverse horizontal direction across the upper ends of the bays. The upper ends of each of the bays in turn such as the bay 11 shown in FIG. 3 includes at least one angle iron 31 as a part of its structure. The clamp means forming part of the compound supporting and clamping structure includes a U-bolt 32 shown exploded above the angle iron 31 but normally arranged to straddle this angle iron for cooperation with an integral metal member bent to define an inverted U-shape defining part of the clamp means 24.

FIG. 4 is a fragmentary cross-section of a portion of the grid unit 22a of FIG. 3 wherein it will be noted that the points of intersection of the various tubular members 27 with the bars 26 are welded.

Referring now to FIGS. 5 and 6 the assembly of the compound supporting and clamping means for the grids will be better understood. FIG. 5 illustrates a cross-section of the two-bar support channels 29 and 30. It will be noted that the toes defined by the end flanges 28 on the ends of the bar members are received between the channels 29 and 30, the bar members resting on top of these channels when assembling modular grid units in end to end relationship.

In FIG. 6, there is illustrated the co-operation of the U-bolt 32 with the integral metal member making up part of the clamp 24. The inverted U-shape of this metal member is shown at 33 and includes legs straddling the side by side bars 26 to adjacent grid units. These legs are bent outwardly as shown at 34 and 35 and include skirts 36 and 37 which in turn straddle the channel members 29 and 30 making up the two-bar support. This portion of the clamp means 24 thus secures together side by side modular grids and also the opposing channels 29 and 30 making up the support means.

The arms of the U-bolt 32 are shown at 32' and 32'' extending upwardly on either side of the angle iron 31 forming part of the upper bay structure. These arms pass between the channel members 29 and 30 to extend through openings in the metal outwardly bent portions 34 and 35 of the clamp means. Securing nuts 38 and 39 are threadedly received on the ends of the arm to tie the entire structure together.

Referring once again to the exploded perspective view of FIG. 3, it will now be clear that the compound supporting and clamping means functions to secure the modular grid units in both side by side and end to end relationship. There will thus be provided a single clamp means and U-bolt at the side and end portions of four adjacent grid units.

OPERATION

From the foregoing description, it will be evident the manner in which the grid units can be rapidly assembled in a telephone switching office. Since each modular grid unit is identical, large numbers of the grid units may be economically manufactured. In the actual installation, the abutting side by side portions of the grid units are lined vertically above the upper ends of the bays. Since the width D of each of the modular grid units corresponds to the spacing between the bays, the angle irons running along the upper ends of the bays will always be in proper position for cooperation with the compound supporting and clamping means described in FIGS. 5 and 6.

Once the entire grid structure has been assembled, it is a simple matter to run cable between the various switch panels, there always being effected a direct point to point overhead connection.

As a specific example of the importance of the present invention over the prior system employing traditional cable racks, the telephone switching office at Sylmar, California which serves approximately 9,500 customers was completely restored after the Feb. 9, 1971 earthquake in approximately 6 weeks rather than the normal 18 to 20 months.

While a specific embodiment of the invention has been described, the method and apparatus for running telephone cable is not to be thought of as limited to the particular example set forth.

What is claimed is:

1. An apparatus for use in place of conventional cable racks for running cable between switch panels mounted on vertical bays in a central telephone office, comprising: a grid structure for mounting in a horizontal plane adjacent to the upper ends of said bays, said grid structure defining openings of sufficient size that cable may be easily manually passed therethrough and yet supported thereby when running horizontally along the top of the grid structure without appreciable sagging of those cable portions passing over the openings, whereby cable utilized for connections between selected switch panels is not confined to any pre-assigned path but may be run directly upwardly from a first switch panel, through an opening in the grid structure, and thence in a horizontal straight line path along the top of the grid structure to another opening directly above a second switch panel to which the cable is to be connected and downwardly through the opening to said second switch panel, with the grid structure being comprised of modular grid units, each grid unit having a width corresponding to the distance between adjacent bays such that the grid units may be assembled in abutting side by side and end to end relationship to define the overall grid structure with the abutting side by side portions vertically aligned with the upper ends of the bays, each of the modular grid units comprising a plurality of hollow bars running in a longitudinal transversely spaced parallel relationship each end of the hollow bars including a flange portion extending downwardly beyond the bottom surface of the bar to define a toe; and a plurality of tubular members running transversely between the longitudinal bars to define therewith rectangular shaped openings, said tubular members being welded to said bars at their points of intersection to provide a rigid modular grid unit; and compound supporting and clamping means for securing said modular grid units in side by side and end to end relationship to the upper ends of the bays, said means including channel members in opposing relationship to define a two-bar support means running in a transverse horizontal direction across the upper ends of said bays, the abutting toes on the abutting ends of the modular grid units in end to end relationship being received between said channel members making up the two-bar support; and clamp means in the form of an integral metal member bent to define an inverted U-shape, the legs of the U-shape being bent outwardly and including downwardly depending side skirts, the inverted U portion being dimensioned to straddle the hollow bars of the grid units that are in abutting side by side relationship resting on the two-bar support and the downwardly depending side skirts being dimensioned to straddle the channel members making up the two-bar supports, and a U-bolt arranged to pass around an upper structural portion of a bay, the arms of the U-bolt passing up between the opposing channel members and through openings in the outwardly extending portions of the legs of said metal member; and nuts threadedly received on the extending upper ends of the U-bolt to thereby provide simultaneous clamping of the two-bar to the bay and the abutting side bars of side by side and end to end modular grid units to the two-bar support.

2. An apparatus according to claim 1, including ceiling support means for securing said two-bar supports relative to the ceiling of the building structure in said central telephone office housing said bays.

* * * * *